(12) United States Patent
Biller et al.

(10) Patent No.: US 9,145,119 B2
(45) Date of Patent: Sep. 29, 2015

(54) BRAKE SYSTEM FOR MOTOR VEHICLES AND METHOD FOR OPERATING A BRAKE SYSTEM

(75) Inventors: Harald Biller, Eschborn (DE);
Hans-Jörg Feigel, Rosbach (DE);
Stefan A. Drumm, Saulheim (DE);
Steffen Linkenbach, Eschborn (DE);
Marco Besier, Bad Schwalbach (DE)

(73) Assignee: CONTINENTAL TEVES AG & CO. OHG, Frankfurt (DE)

( * ) Notice: Subject to any disclaimer, the term of this patent is extended or adjusted under 35 U.S.C. 154(b) by 14 days.

(21) Appl. No.: 14/112,821

(22) PCT Filed: Apr. 16, 2012

(86) PCT No.: PCT/EP2012/056870
§ 371 (c)(1),
(2), (4) Date: Nov. 7, 2013

(87) PCT Pub. No.: WO2012/143313
PCT Pub. Date: Oct. 26, 2012

(65) Prior Publication Data
US 2014/0203626 A1 Jul. 24, 2014

(30) Foreign Application Priority Data

| Apr. 19, 2011 | (DE) | ................... | 10 2011 007 655 |
| Apr. 19, 2011 | (DE) | ................... | 10 2011 007 658 |
| May 5, 2011 | (DE) | ................... | 10 2011 075 330 |
| Apr. 11, 2012 | (DE) | ................... | 10 2012 205 862 |

(51) Int. Cl.
*B60T 13/68* (2006.01)
*B60T 13/58* (2006.01)
(Continued)

(52) U.S. Cl.
CPC . *B60T 13/58* (2013.01); *B60T 7/02* (2013.01);
*B60T 8/17* (2013.01); *B60T 8/4081* (2013.01);
*B60T 13/588* (2013.01); *B60T 13/66* (2013.01);
*B60T 13/686* (2013.01)

(58) Field of Classification Search
CPC ..... B60T 13/142; B60T 13/588; B60T 13/66;
B60T 13/686; B60T 8/4081
USPC .............. 303/11, 113.3, 113.4, 114.1, 114.2,
303/115.2, 116.1, 116.2
See application file for complete search history.

(56) References Cited

U.S. PATENT DOCUMENTS

| 6,446,435 B1 * | 9/2002 | Willmann et al. ............. | 60/533 |
| 6,899,403 B2 * | 5/2005 | Isono et al. .................... | 303/11 |

(Continued)

FOREIGN PATENT DOCUMENTS

| DE | 195 38 794 A1 | 4/1997 |
| DE | 195 43 582 A1 | 6/1997 |

(Continued)

OTHER PUBLICATIONS

German Examination Report—Feb. 19, 2013.
(Continued)

*Primary Examiner* — Thomas Irvin
(74) *Attorney, Agent, or Firm* — Brinks Gilson & Lione

(57) ABSTRACT

A brake system includes a hydraulic actuating unit, which can be actuated by way of a brake pedal, a travel simulator interacting with the hydraulic actuating unit, a pressure medium reservoir under atmospheric pressure assigned to the hydraulic actuating unit, a first electrically controllable pressure supply device, a second electrically controllable pressure supply device, an electronic control unit and an electronically controllable pressure modulation device for setting wheel-specific brake pressures. The brake system preferably operates in a "brake-by-wire" mode but can also operate in a fallback mode. The second electrically controllable pressure supply device can provide boost volume during braking in a fallback mode.

13 Claims, 7 Drawing Sheets

(51) Int. Cl.
  *B60T 8/40* (2006.01)
  *B60T 7/02* (2006.01)
  *B60T 8/17* (2006.01)
  *B60T 13/66* (2006.01)

(56) References Cited

U.S. PATENT DOCUMENTS

| | | | | |
|---|---|---|---|---|
| 7,630,815 | B2* | 12/2009 | Tanaka et al. | 701/70 |
| 7,651,176 | B2* | 1/2010 | Inoue et al. | 303/114.1 |
| 8,224,545 | B2* | 7/2012 | Tanaka et al. | 701/70 |
| 8,333,442 | B2* | 12/2012 | Hatano et al. | 303/115.1 |
| 8,447,486 | B2* | 5/2013 | Nakata et al. | 701/70 |
| 8,517,476 | B2* | 8/2013 | Okano et al. | 303/167 |
| 8,840,199 | B2* | 9/2014 | Hatano et al. | 303/115.2 |
| 8,911,030 | B2* | 12/2014 | Ohnishi et al. | 303/115.1 |
| 8,926,027 | B2* | 1/2015 | Shimada | 303/10 |
| 2008/0223670 | A1 | 9/2008 | Toyohira et al. | |
| 2009/0179483 | A1* | 7/2009 | Hatano | 303/3 |
| 2009/0199555 | A1* | 8/2009 | Hatano | 60/545 |
| 2009/0229931 | A1* | 9/2009 | Baumann et al. | 188/72.2 |
| 2011/0148185 | A1* | 6/2011 | Okano et al. | 303/6.01 |
| 2011/0241419 | A1* | 10/2011 | Ohkubo et al. | 303/9.62 |
| 2012/0112525 | A1* | 5/2012 | Shimada | 303/10 |
| 2012/0119566 | A1* | 5/2012 | Ohnishi et al. | 303/20 |
| 2012/0193975 | A1* | 8/2012 | Ishii | 303/14 |
| 2012/0326491 | A1* | 12/2012 | Gotoh et al. | 303/6.01 |
| 2013/0147259 | A1* | 6/2013 | Linkenbach et al. | 303/14 |
| 2014/0008965 | A1* | 1/2014 | Ito et al. | 303/3 |
| 2014/0008966 | A1* | 1/2014 | Hotani et al. | 303/14 |
| 2014/0028084 | A1* | 1/2014 | Biller et al. | 303/9.62 |
| 2014/0110997 | A1* | 4/2014 | Biller et al. | 303/9.62 |
| 2014/0152085 | A1* | 6/2014 | Biller et al. | 303/10 |
| 2014/0203626 | A1* | 7/2014 | Biller et al. | 303/10 |
| 2014/0225425 | A1* | 8/2014 | Drumm et al. | 303/9.75 |
| 2015/0020520 | A1* | 1/2015 | Feigel et al. | 60/534 |
| 2015/0021978 | A1* | 1/2015 | Feigel | 303/15 |
| 2015/0025767 | A1* | 1/2015 | Feigel | 701/70 |
| 2015/0035353 | A1* | 2/2015 | Drumm | 303/15 |
| 2015/0061364 | A1* | 3/2015 | Murayama et al. | 303/15 |
| 2015/0061854 | A1* | 3/2015 | Drumm et al. | 340/453 |

FOREIGN PATENT DOCUMENTS

| | | |
|---|---|---|
| DE | 199 05 660 A1 | 5/2000 |
| DE | 10 2008 010 528 A1 | 9/2008 |
| DE | 10 2008 015 241 A1 | 9/2008 |
| DE | 10 2009 031 392 A1 | 1/2010 |
| DE | 10 2012 205 859 A1 | 10/2012 |
| DE | 102012205861 A1 | 10/2012 |
| DE | 102012205895 A1 | 10/2012 |
| EP | 0 280 740 A1 | 8/1987 |
| EP | 0 485 367 A2 | 6/1989 |
| EP | 1 334 893 A2 | 8/2003 |
| EP | 1 481 863 A1 | 1/2004 |
| EP | 2 520 473 A1 | 11/2012 |
| JP | 2008-100588 | 5/2008 |
| JP | 2010-52504 | 3/2010 |
| WO | WO 91/05686 | 5/1991 |
| WO | WO 00/34097 | 6/2000 |
| WO | WO 2011/029812 A1 | 3/2011 |

OTHER PUBLICATIONS

PCT International Search Report—Jul. 19, 2012.

* cited by examiner

BRAKE SYSTEM FOR MOTOR VEHICLES AND METHOD FOR OPERATING A BRAKE SYSTEM

CROSS-REFERENCE TO RELATED APPLICATIONS

This application claims priority to German Patent Application Nos. 10 2011 007 658.1, filed Apr. 19, 2011, 10 2011 007 655.7, filed Apr. 19, 2011, 10 2011 075 330.3, filed May 5, 2011, and 10 2012 205 862.1, filed Apr. 11, 2012 and PCT/EP2012/056870, filed Apr. 16, 2012.

FIELD OF THE INVENTION

The invention relates to a brake system for motor vehicles and to a method for operating a brake system.

BACKGROUND OF THE INVENTION

There are known hydraulic vehicle brake systems which are designed as power brake systems and, in addition to a muscle-powered brake master cylinder, to which wheel brakes are hydraulically connected and which supplies pressure and volume for actuating wheel brakes, comprise a further, electrically controllable pressure and volume supply device which activates the wheel brakes in a "brake-by-wire" operating mode. If the electrically controllable pressure and volume supply device fails, the wheel brakes are actuated exclusively by the muscle power of the vehicle driver (unboosted fallback operating mode).

WO 2011/029812 A1 has disclosed an electrohydraulic brake system having a brake master cylinder that can be actuated by a brake pedal, a travel simulator and a pressure supply device. In a "brake-by-wire" operating mode, the wheel brakes are supplied with pressure by the pressure supply device. In the fallback operating mode, the wheel brakes are supplied with the pressure applied by the driver by way of the brake master cylinder, which can be actuated by way of the brake pedal. It is felt to be a disadvantage with the previously known brake system that, if the control or drive of the electrically controllable pressure supply device fails, the driver has to produce large brake pedal travels to achieve adequate service braking deceleration.

It is therefore the object of the present invention to improve a brake system of the type stated at the outset in such a way that the vehicle driver can comfortably achieve adequate service braking deceleration despite failure of the pressure supply device.

SUMMARY AND INTRODUCTORY DESCRIPTION OF THE INVENTION

According to the invention, this object is achieved by a brake system and by a method described herein.

The invention is based on the concept of providing a second electrically controllable pressure supply device having at least one intake port and one pressure port, the intake port of which is connected to a pressure medium reservoir and the pressure port of which can be connected or is connected to that brake circuit section of a brake circuit which can be pressurized "by wire". This enables the second pressure supply device to supply additional pressure medium volume for a pressure buildup in the brake circuit from the pressure medium reservoir, thereby making it possible to achieve volume boosting of a driver braking demand.

The intake port is preferably connected directly, i.e. without the interposition of a valve or via a further hydraulic component, to the pressure medium reservoir, thus allowing pressure medium to be drawn in unhindered, i.e. without the restricting effect of a valve. Via this direct connection, pressure medium can be drawn in from the pressure medium reservoir, even when the brake master cylinder is being actuated.

One advantage of the invention consists in the fact that a shortening of the brake pedal travel that has to be produced by the vehicle driver is achieved by way of the second pressure supply device, thus enabling the vehicle driver comfortably to achieve adequate service braking deceleration despite the failure of the first pressure supply device.

Another advantage of the brake system according to the invention consists in the fact that a brake pressure buildup can be performed in a highly dynamic manner by the first pressure supply device. This is achieved by virtue of the fact that no further valve is provided in the hydraulic connection between a sequence valve and the associated inlet valves in each brake circuit, i.e. there is no additional flow resistance.

The isolation valve is in each case preferably arranged in a hydraulic connecting line between the pressure space and a brake circuit section which supplies the inlet valves with pressure and can be pressurized "by wire", and thus allows selective closure or opening of the hydraulic connection between the pressure space and the brake circuit section. As a particularly preferred option, the isolation valves are embodied so as to be open when deenergized (normally open) in order to ensure that the brake circuit sections are connected hydraulically to the brake master cylinder in a deenergized fallback operating mode and can thus be supplied with pressure by the vehicle driver.

The sequence valve is in each case preferably arranged in a hydraulic connecting line between the first pressure supply device and the brake circuit section and thus allows selective opening or closure of the hydraulic connection between the first pressure supply device and the brake circuit section. As a particularly preferred option, the sequence valves are embodied so as to be closed when deenergized (normally closed) in order to ensure that the brake circuit section is hydraulically separated from the first pressure supply device in a deenergized fallback operating mode.

The first electronic control unit is preferably designed to activate the electrically controllable pressure supply device by closed-loop or open-loop control of the hydraulic pressure output by the supply device. Moreover, the first control unit is advantageously used to exercise closed-loop or open-loop control over the isolation valves and sequence valves and over the simulator enabling valve of the brake system.

The brake system preferably comprises one inlet valve and one outlet valve per wheel brake for setting wheel-specific brake pressures, which are derived from the pressures of the brake circuit pressures associated with the brake circuit sections, wherein the inlet valves transmit the brake circuit section pressure to the wheel brakes in the unactivated state and limit or prevent the wheel brake pressure buildup in the activated state, and wherein the outlet valves prevent an outflow of pressure medium from the wheel brakes into a pressure medium reservoir in the unactivated state and permit and control such an outflow in the activated state, wherein the inlet valves are closed, resulting in a wheel brake pressure reduction.

The inlet valves and outlet valves are preferably likewise activated by the first electronic control unit, wherein the inlet valves and outlet valves are arranged in a single modular unit with the brake master cylinder, the isolation valves, the first electrically controllable pressure supply device, the sequence valves, the simulation device and the first electronic control unit.

The second pressure supply device is preferably of dual-circuit or multi-circuit hydraulic design. As a particularly preferred option, it comprises two hydraulic pumps driven jointly by an electric motor, wherein the intake ports of the first and second pumps are connected to a pressure medium reservoir, and the pressure ports of the first and second pumps can each be connected or are each connected to a brake circuit section of the associated brake circuit which can be pressurized "by wire". As a very particularly preferred option, the pumps are each connected by a dedicated connecting line to a pressure medium reservoir or to a pressure medium reservoir chamber assigned to the respective brake circuit. It is advantageous if the second pressure supply device comprises a rotor angle sensor, which detects the instantaneous phase angle of the pump drive, i.e. of the electric motor, allowing closed-loop activation of the drive of the pressure supply device.

For closed-loop control of the additional pressure medium volume in a manner specific to each brake circuit, an electrically operable overflow valve, which is closed when deenergized (normally closed), is in each case provided for the first and the second pump circuit, the valve being connected in parallel with the pump. Particularly accurate closed-loop control can be achieved by way of an overflow valve which is activated in an analog manner.

According to a development of the invention, an electrically operable valve, advantageously a valve which is closed when deenergized (normally closed), is in each case provided for the first and the second pump, the valve being arranged in the hydraulic connection between the pressure port and the brake circuit section. In the case of a second pressure supply device which is only in the supply position, the valve is closed when deenergized (normally closed) and thus prevents pressurization of the pump and a possible loss of pressure medium due to outflow from the brake circuit section into the pump.

In order to be able to have available an unlimited volume of pressure medium for practical applications, each intake port of the second pressure supply device is preferably connected to a hydraulic reservoir connection line which leads to a pressure medium reservoir which is under atmospheric pressure.

According to a preferred embodiment of the brake system according to the invention, each intake port is combined sectionwise with a hydraulic return line, which connects an outlet valve assigned to a wheel brake to a pressure medium reservoir under atmospheric pressure. It is thereby possible to minimize the number of connecting lines and to achieve a brake system of compact construction. In order to achieve separation of the brake circuits, it is particularly preferred if, for each brake circuit, the outlet valves assigned to the brake circuit and the intake port assigned to the brake circuit are connected by a dedicated return line to the pressure medium reservoir or to a chamber of the pressure medium reservoir.

An electrically operable control valve, advantageously a control valve which is activated in an analog manner, is preferably arranged in the hydraulic connection between the outlet valve and the intake port. It is thereby possible to discharge pressure medium volume without pulsations and noise.

According to a development of the invention, a pressure detection device is provided, which detects the pressure on the pressure port side of the second pressure supply device, thereby allowing monitoring of the brake circuit pressure. As a particularly preferred option, there is one such pressure detection device in each brake circuit.

For activation of the second pressure supply device and for evaluation of the output signals of the pressure detection device or pressure detection devices, the brake system preferably comprises a second electronic control unit. As a particularly preferred option this also assumes the task of activating any overflow valves and/or control valves arranged between the outlet valves and the intake port and/or valves arranged between the pressure port and the brake circuit.

The second pressure supply device, the pressure detection device or pressure detection devices and the second electronic control unit are preferably arranged in a self-contained subassembly, with the result that modular construction is achieved, simplifying the testing and assembly of the brake system. If appropriate, this subassembly advantageously also comprises the overflow valves and/or the control valves arranged between the outlet valves and the intake port and/or the valves arranged between the pressure port and the brake circuit. In order to be able to maintain a volume-boosted fallback operating mode if the onboard electrical system fails, the second pressure supply device, the pressure detection device(s) and the second electronic control unit, particularly preferably the self-contained subassembly, are preferably supplied with energy by an independent electric energy source.

According to a preferred embodiment of the brake system according to the invention, the inlet valves and outlet valves are activated by the second electronic control unit if the inlet and outlet valves are arranged in a self-contained subassembly with the second pressure supply device, the pressure detection device or pressure detection devices and the second electronic control unit.

The simulation device, which, in the "brake-by-wire" operating mode, conveys the accustomed haptic brake pedal sensation to the vehicle driver, is connected hydraulically to one of the pressure spaces of the brake master cylinder. The action of the simulation device can be switched on and off by way of the simulator enabling valve. In the unboosted and in the boosted fallback operating mode, the simulation device is advantageously switched off.

The first electrically controllable pressure supply device is preferably formed by a cylinder-piston arrangement, the piston of which can be actuated by an electromechanical actuator. An electrohydraulic actuator of this kind operates in a particularly dynamic way and very quietly and copes without problems with the number of load reversals required for brake systems.

The brake system furthermore preferably comprises at least one pressure sensor for detecting a pressure of the brake master cylinder and one pressure sensor for detecting the pressure of the first pressure supply device. The brake system furthermore advantageously comprises a travel or angle sensor for detecting a location or position of the first pressure supply device and a travel or angle sensor for detecting a brake pedal actuation. At least the signals of the three first-mentioned sensors are preferably processed by the first electronic control unit.

The invention also relates to a method for operating a brake system according to the invention. For this purpose, advantageously when no pressure buildup or pressure reduction can be carried out by way of the first pressure supply device or when a malfunction of one of the components required for the "brake-by-wire" operating mode is detected, e.g. when a failure of the first electrically controllable pressure supply device or of the activation thereof is detected and the vehicle driver actuates the brake pedal, pressure medium is drawn in from a pressure medium reservoir by way of the second electrically controllable pressure supply device and is fed into the associated brake circuit sections. In order to have available sufficient pressure medium, the pressure medium is preferably drawn in from a pressure medium reservoir under atmospheric pressure, which is advantageously connected to the return lines.

According to a preferred embodiment of the method according to the invention, the first control unit outputs a confirmation signal to a second control unit designed for activating the second pressure supply device for as long as a pressure buildup or pressure reduction can be carried out by way of the first pressure supply device. If the confirmation signal does not occur, the second control unit can bring about appropriate activation of the second pressure supply device.

Actuation of the brake pedal is preferably detected in the second control unit by way of the signals of a travel detection device which detects an actuating travel of a piston of the brake master cylinder.

BRIEF DESCRIPTION OF THE DRAWINGS

Further preferred embodiments of the invention will become apparent from the following description by way of the figures in the form of schematic drawings, in which.

DETAILED DESCRIPTION OF THE INVENTION

Figure 1:
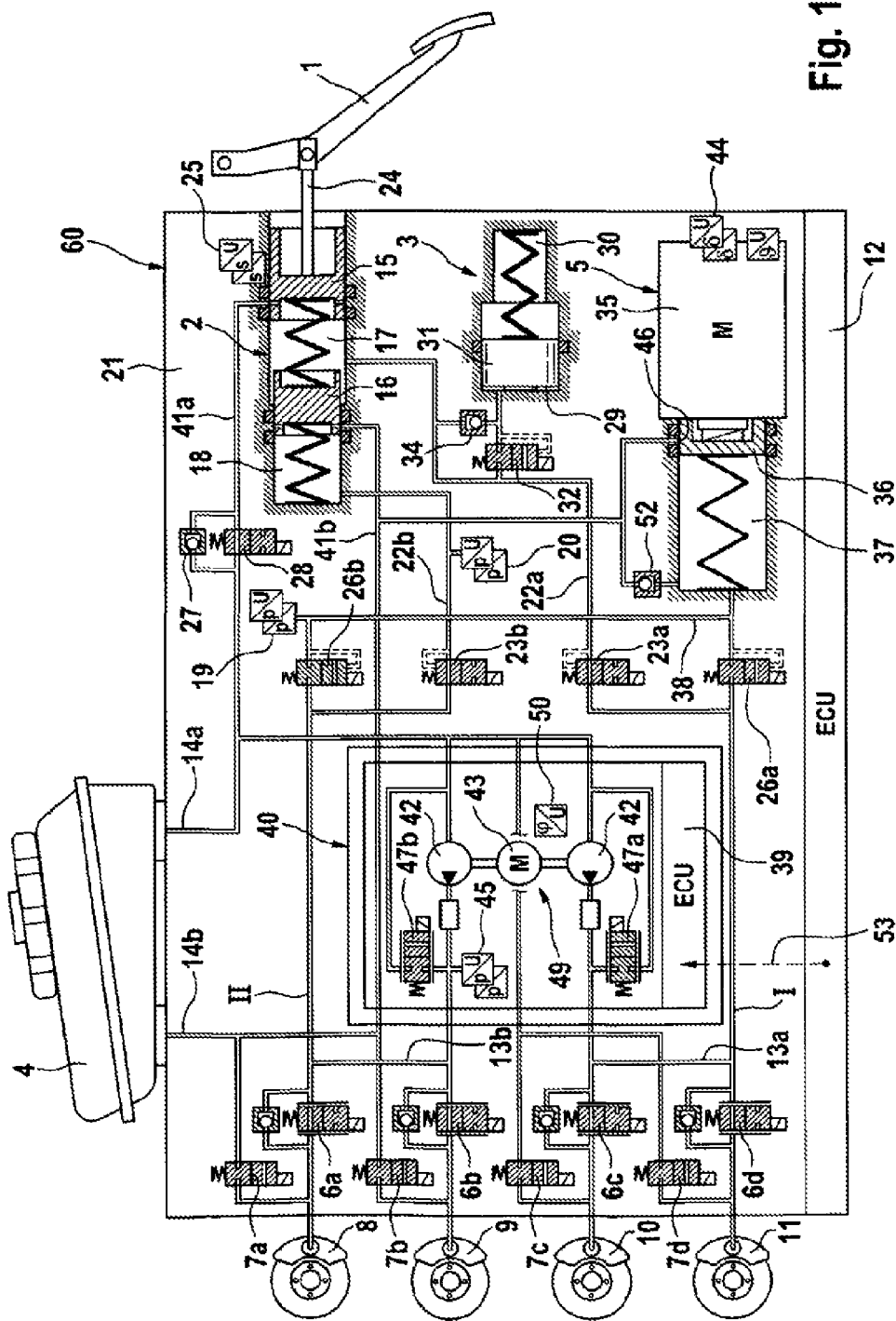
FIG. 1 shows a first illustrative embodiment of a brake system according to the invention.

A first illustrative embodiment of a brake system according to the invention is shown schematically in FIG. 1. The brake system essentially comprises a hydraulic actuating unit 2, which can be actuated by way of an actuating or brake pedal 1, a travel simulator or simulation device 3 interacting with the hydraulic actuating unit 2, a pressure medium reservoir 4 under atmospheric pressure assigned to the hydraulic actuating unit 2, a first electrically controllable pressure supply device 5, a second electrically controllable pressure supply device 49, an electronic control unit 12 and an electronically controllable pressure modulation device for setting wheel-specific brake pressures.

The pressure modulation device, which is not denoted specifically, comprises one inlet valve 6a-6d and one outlet valve 7a-7d for each wheel brake 8, 9, 10, 11 of a motor vehicle (not shown) for example, the valves being connected together hydraulically in pairs by center connections and being connected to the wheel brakes 8, 9, 10, 11. The input ports of the inlet valves 6a-6d are supplied via brake circuit sections 13a, 13b with pressures which, in a "brake-by-wire" operating mode, are derived from a system pressure present in a system pressure line 38 connected to a pressure space 37 of the first electrically controllable pressure supply device 5. Respective check valves (not denoted specifically) opening toward the brake circuit sections 13a, 13b are connected in parallel with the inlet valves 6a-6d. In an unboosted fallback operating mode, the brake circuit sections 13a, 13b are supplied with the pressures of the pressure spaces 17, 18 of the actuating unit 2 via hydraulic lines 22a, 22b. The output ports of the outlet valves 7a-7d are connected in pairs to the pressure medium reservoir 4 by return lines 14a, 14b. A pressure sensor 19, preferably of redundant design, is provided for detecting the pressure prevailing in the system pressure line 38. According to the example, wheel brakes 8 and 9 are assigned to the left hand front wheel and the right-hand rear wheel and wheel brakes 10 and 11 are assigned to the left-hand rear wheel and the right-hand front wheel. Other circuit divisions are likewise conceivable.

In a housing 21, the hydraulic actuating unit 2 has two pistons 15, 16 arranged in series, which delimit hydraulic chambers or pressure spaces 17, 18 which, together with the pistons 15, 16, form a dual-circuit brake master cylinder or tandem master cylinder.

The pressure spaces 17, 18 are connected, on the one hand, to the pressure medium reservoir 4 via radial bores formed in the pistons 15, 16 and via corresponding pressure equalizing lines 41a, 41b (the pressure equalizing lines 41a, 41b are shown combined sectionwise with the return lines 14a and 14b, but separate lines are also possible), wherein the equalizing lines can be shut off by way of a relative movement of the pistons 17, 18 in the housing 21, and are connected, on the other hand, to the abovementioned brake circuit sections 13a, 13b by way of the hydraulic lines 22a, 22b. In this case, a diagnostic valve 28 which is open when deenergized (normally open) is connected in parallel in the pressure equalizing line 41a with a check valve 27, which closes toward the pressure medium reservoir 4. The pressure spaces 17, 18 accommodate return springs (not denoted specifically), which position the pistons 15, 16 in a starting position when the brake master cylinder 2 is unactuated. A piston rod 24 couples the pivoting movement of the brake pedal 1 due to a pedal actuation to the translatory movement of the first (master cylinder) piston 15, the actuation travel of which is detected by a travel sensor 25, which is preferably of redundant design. As a result, the corresponding piston travel signal is a measure of the brake pedal actuation angle. It represents the braking demand of a vehicle driver.

Respective isolation valves 23a, 23b separate the brake circuits I, II into a brake circuit or line section 22a, 22b that can be pressurized by the brake master cylinder 2 and the brake circuit section 13a, 13b already mentioned, which can be pressurized by the first pressure supply device 5 in the "brake-by-wire" operating mode. The isolation valves 23a, 23b are designed as electrically operable 2/2-way valves, which are preferably open when deenergized (normally open). By way of the isolation valves 23a, 23b, the hydraulic connection between the pressure spaces 17, 18 and the brake circuit sections 13a, 13b can be shut off. A pressure sensor connected to line section 22b detects the pressure built up in pressure space 18 by a displacement of the second piston 16.

Travel simulator 3 is coupled hydraulically to the brake master cylinder 2 and is, for example, designed as a self-contained subassembly which consists essentially of a simulator chamber 29, a simulator spring chamber 30 and a simulator piston 31, which separates the two chambers 29, 30 from one another. Simulator piston 31 is supported on the housing 21 by an elastic element (e.g. a spring) arranged in simulator spring chamber 30, the element advantageously being preloaded. According to the example, the simulator chamber 29 can be connected to the first pressure space 17 of the tandem brake master cylinder 2 by way of an electrically operable simulator enabling valve 32. As an alternative, the simulator enabling valve can be embodied so as to be mechanically operable. When a pedal force is input and the simulator enabling valve 32 is activated, pressure medium flows from the brake master cylinder pressure space 17 into the simulator chamber 29. A check valve 34 connected hydraulically so as to be anti-parallel to the simulator enabling valve 32 allows largely unhindered return flow of the pressure medium from the simulator chamber 29 to the brake master cylinder pressure space 17, irrespective of the operating state of the simulator enabling valve 32.

The first electrically controllable pressure supply device 5 is designed as a hydraulic cylinder-piston arrangement or a single-circuit electrohydraulic actuator, the piston 36 of which can be actuated by a schematically indicated electric motor 35 via a rotation/translation mechanism, likewise illustrated schematically. A rotor position sensor (indicated only schematically), which serves for detection of the rotor position of the electric motor 35, is denoted by reference sign 44. In addition, a temperature sensor for detecting the temperature of the motor winding can also be used. The piston 36 delimits a pressure space 37. Two elastomer sealing rings are used to seal off the gap between the piston 36 and the wall of the pressure space, wherein a port 46 connected to the pressure medium reservoir 4 ensures low-pressure-side wetting of the pressure-bearing elastomer sealing ring and hydraulic-side wetting of the media-dividing elastomer sealing ring.

The actuator pressure produced by the action of the force of the piston 36 on the pressure medium enclosed in pressure space 37 is fed into the system pressure line 38 and detected by way of the system pressure sensor 19. In the "brake-by-wire" operating mode, the system pressure line 38 is connected via the sequence valves 26a, 26b to brake circuit sections 13a, 13b. In this way, a wheel brake pressure buildup and reduction is obtained for all the wheel brakes 8, 9, 10, 11 in the case of a normal braking operation. In the case of a pressure reduction, the pressure medium previously displaced from the pressure space 37 of the actuator 5 into the wheel brakes 8, 9, 10, 11 flows back into the pressure space 37 of the actuator 5 over the same route. In the case of braking with wheel brake pressures that differ for each individual wheel and are controlled with the aid of the modulation valves 6a-6d, 7a-7d, in contrast, the pressure medium fraction discharged via the outlet valves 7a-7d flows into the pressure medium reservoir 4. Additional pressure medium can be drawn into the pressure space 37 through retraction of the piston 36 with sequence valves 26a, 26b closed, with pressure medium flowing out of the reservoir 4, via an anti-cavitation valve 52, designed as a check valve which is open toward the actuator in the direction of flow, into the actuator pressure space 37.

The brake system furthermore comprises a second electronically controllable pressure supply device 49, which, according to the example, is embodied in a self-contained module ("boost module") 40 with a dedicated electronic control unit 39. In the event of failure of the first pressure supply device 5, a high service braking deceleration can nevertheless be achieved by activating the second pressure supply device 49. Boost module 40 or pressure supply device 49 is inserted hydraulically between the return line 14a to the pressure medium reservoir 4 and brake circuit sections 13a, 13b. Thus, pressure supply device 49 draws pressure medium out of the pressure medium reservoir 4 and feeds the pressure medium discharged by it directly into brake circuit sections 13a, 13b. Pressure supply device 5, in contrast, feeds the pressure medium discharged by it into the system pressure line 38, which is or can be separated from brake circuit sections 13a, 13b by the sequence valves 26a, 26b. Brake master cylinder 2 feeds the pressure medium discharged by it into lines 22a, 22b, which can be separated from brake circuit sections 13a, 13b or I, II by the isolation valves 26a, 26b.

According to the example, pressure supply device 49 comprises a pump 42 driven by an electric motor 43 and, according to the example, is of double-flow design with two pumps 42 assigned to the brake circuits I, II. The intake sides of the pumps 42 are connected hydraulically to a reservoir connection line (not denoted specifically) which, according to the example, is combined in part with return line 14a, while the pressure sides of the pumps 42 are connected hydraulically to brake circuit sections 13a, 13b and hence to the inlet-side ports of the inlet valves 6a-6d. The drive of the pump advantageously comprises a rotor angle sensor 50, which detects the instantaneous phase angle of the electric motor 43 and can be used to activate the electric motor 43.

The motor-pump assembly 42, 43 is preferably designed to be of the type of a piston pump 42 driven by the electric motor 43 via an eccentric, of a construction which is already in use in millions of instances in known brake systems as a return pump. These can produce particularly high system pressures and can be implemented in a very compact overall size.

According to the example, boost module 40 comprises not only the electronic control unit 39 and the motor-pump assembly 42, 43 but also a pressure sensor 45, which is connected to a pressure side of the pump 42 and which, according to the example, is assigned to brake circuit II, plus a control valve (overflow valve) 47a, 47b for each brake circuit I, II, the valve being connected in parallel with the pump 42, advantageously being activatable in an analog manner, and being embodied so as to be closed when deenergized (normally closed). Control unit 39 serves to activate the overflow valves 47a, 47b and the electric motor 43 and to supply energy and evaluate a signal of the pressure sensor 45.

According to an illustrative embodiment which is not shown, the pump 42 in each brake circuit I, II is connected in parallel with a control valve 47a, 47b, which can advantageously be activated in an analog manner and which is embodied so as to be open when deenergized (normally open), and with a check valve, which is connected in parallel with the control valve 47a, 47b and opens in the direction of the wheel brakes 8, 9, 10, 11. The check valves serve primarily for a rapid brake pressure buildup by the driver.

The abovementioned components 2, 3, 5, 6a-6d, 7a-7d, 19, 20, 22a, 22b, 23a, 23b, 25, 26a, 26b, 27, 28, 32, 34, 38, 41a, 41b, 44, 46, 52 can be combined into a second electrohydraulic module, which is provided with the reference sign 60. The electronic control unit 12 is used to activate the electrically operable components of module 60, in particular valves 6a-6d, 7a-7d, 23a, 23b, 26a, 26b, 28, 32 and the electric motor 35 of the first pressure supply device 5. The signals of sensors 19, 20, 25 and 44 are likewise processed in electronic control unit 12. In order to be able to carry out travel-based activation of the second pressure supply device 49 or of module 40, even if electronic control unit 12 fails, the travel sensor 25 is advantageously also connected to the electronic control unit 39 of the boost module 40 and is embodied in such a way, e.g. in redundant or dual form, that travel sensor 25 can supply a travel signal for open-loop control of the second pressure supply device 49 to control unit 39, even if control unit 12 fails. Alternatively, it is also possible for travel sensor 25 to be supplied with electric energy exclusively by the electronic control unit 39 of the boost module 40 and for its signals to be processed only in control unit 39.

During a normal braking function of the brake system ("brake-by-wire" operating mode), brake master cylinder 2 and hence the vehicle driver are decoupled from the wheel brakes 8, 9, 10, 11 by the closed isolation valves 23a, 23b, and brake circuit sections 13a, 13b are connected via the opened sequence valves 26a, 26b to the first pressure supply device 5, which supplies the system pressure for actuation of the wheel brakes 8, 9, 10, 11. Simulation device 3 is connected to the brake master cylinder 2 by the opened simulator enabling valve 32, with the result that the pressure medium volume displaced in the brake master cylinder 2 by the actuation of the brake pedal 1 by the driver is received by the simulation device 3, and the simulation device 3 conveys an accustomed haptic brake pedal sensation to the vehicle driver.

In an unboosted fallback operating mode of the brake system, e.g. if the electric energy supply of the entire brake system (e.g. modules 40 and 60) fails, simulation device 3 is switched off by the simulator enabling valve 32, which is closed when deenergized (normally closed), and the first pressure supply device 5 is separated from brake circuit sections 13a, 13b by the sequence valves 26a, 26b, which are closed when deenergized (normally closed). Brake master cylinder 2 is connected via lines 22a, 22b containing isolation valves 23a, 23b, which are open when deenergized (normally open), to brake circuit sections 13a, 13b and hence to the wheel brakes 8, 9, 10, 11, allowing the vehicle driver to build up pressure directly in the wheel brakes 8, 9, 10, 11 by actuating the brake pedal 1. Pressure medium is prevented from flowing off into the pressure medium reservoir by valves 47a, 47b (and 7a-7d), which are closed when deenergized (normally closed).

In a boosted fallback operating mode of the brake system (e.g. if control unit 12 fails, the electric energy supply of control unit 12 or of module 60 fails or the first pressure supply device 5 is faulty), the components of module 60 remain deenergized, i.e. the simulation device 3 is switched off by the closed simulator enabling valve 32, the first pressure supply device 5 is separated from brake circuit sections 13a, 13b by the closed sequence valves 26a, 26b, and the brake master cylinder 2 is connected to brake circuit sections 13a, 13b via the open isolation valves 23a, 23b. When the brake pedal 1 is actuated, the signal of the travel sensor 25 is used as the driver demand. In accordance with this signal, the pump 42 is activated, and the pressure, which can be checked by way of sensor 45, is adjusted as a function of the travel. One advantage of using the signal of the travel sensor 25 instead of a pressure sensor signal is the early response of module 40. By way of rotation angle control of the pump and/or of valve control of the valves of the functional module 40, no pressure boosting of the driver brake actuation is performed, but volume boosting and hence shortening of the pedal travel is achieved.

In order to increase the availability of the boosted fallback operating mode of the brake system, the boost module 40 is preferably supplied by a second electric energy supply (not shown), which is independent of the electric energy supply (e.g. the onboard electrical network) which supplies module 60 and/or control unit 12.

The control unit 39 of module 40 is connected by at least one data line to control unit 12. If control unit 12 and module 60 are functional, i.e. a pressure buildup can be carried out by way of pressure supply device 5, control unit 12 sends a positive confirmation signal ("okay" signal) to control unit 39. This is indicated in FIG. 1 by the dashed arrow 53. If control unit 39 no longer receives a positive confirmation signal from control unit 12, the boost module 40 goes into a standby mode. If the brake pedal 1 is actuated by the driver in the standby mode, the boost module 40 is activated as described above.

The brake system according to the example in FIG. 1 offers the advantage that it can be produced at reasonable cost since the additional boost module 40 comprises few components, in particular just two electrically activatable control valves 47a, 47b. It is furthermore advantageous that no pump pressure pulses are imposed on the first pressure supply device 5, in particular on the transmission of the first pressure supply device 5, since the sequence valves 26a, 26b are closed during the operation of the pump 42. Since the second pressure supply device 49 or the boost module 40 is arranged hydraulically neither between the brake master cylinder 2 and the inlet valves 6a-6d nor between the first pressure supply device 5 and the inlet valves 6a-6d, a pressure buildup at the wheel brakes 8, 9, 10, 11, in particular by the first pressure supply device 5 in the "brake-by-wire" operating mode, is not impaired by flow resistances of additional valves.

Figure 2:
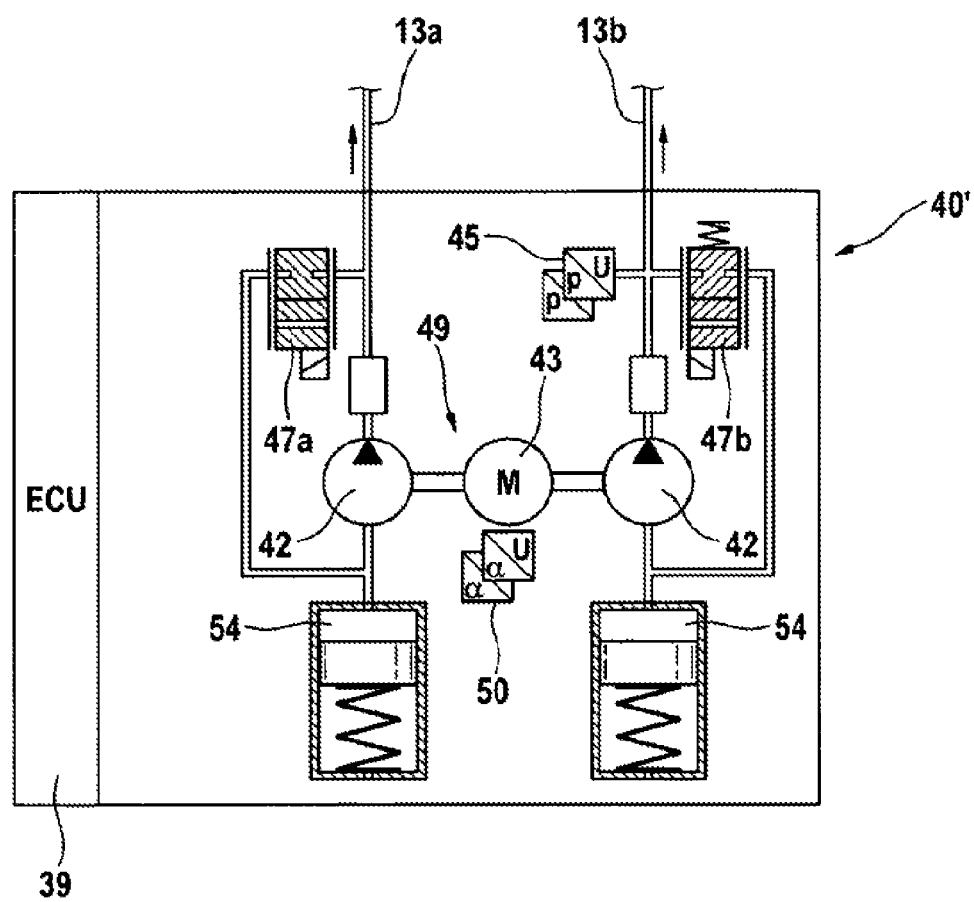
FIG. 2 shows a boost module in accordance with a second illustrative embodiment of a brake system according to the invention.

FIG. 2 shows, on an enlarged scale, a boost module in accordance with a second illustrative embodiment of a brake system according to the invention. Boost module 40' corresponds essentially to the boost module 40 of the first illustrative embodiment. In contrast to the first illustrative embodiment, however, boost module 40' comprises two low-pressure accumulators 54, to which the intake sides of the pumps 42 are hydraulically connected (rather than to the return line 14a of the boost module 40 in accordance with the first illustrative embodiment). The low-pressure accumulators 54 can be filled by way of the pressure supply device 5 via brake circuit sections 13a, 13b. This illustrative embodiment offers the advantage that module 40' is a "closed system", which does not require a reservoir feed line.

Figure 3:
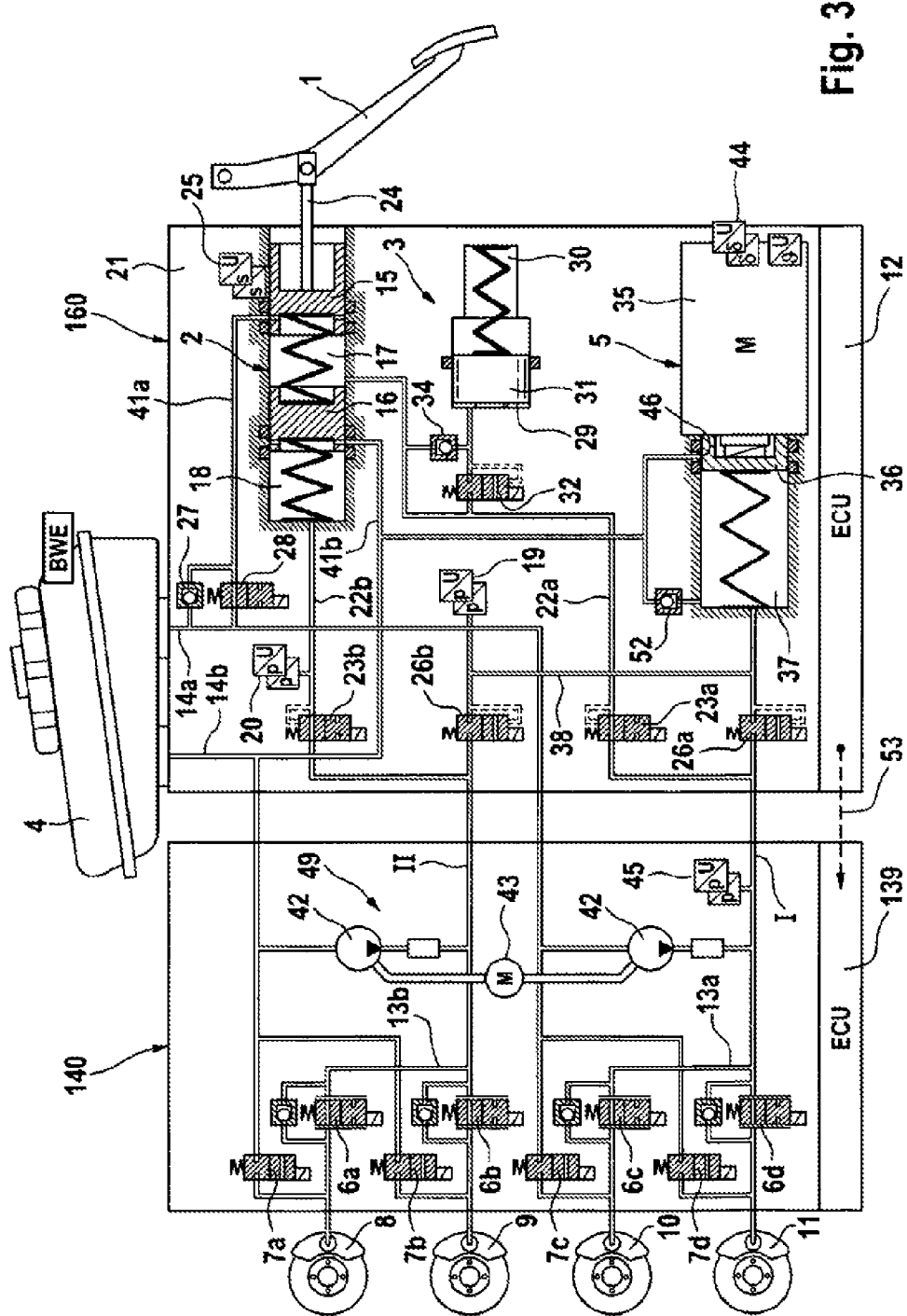
FIG. 3 shows a third illustrative embodiment of a brake system according to the invention.

FIG. 3 shows the hydraulic circuit diagram of a third illustrative embodiment of a brake system according to the invention. In a first electrohydraulic module 160 with a housing 21, the following components, which have already been explained in detail above with reference to FIG. 1, are arranged: actuating unit 2 with pistons 15, 16 and pressure spaces 17, 18, travel sensor 25, pressure equalizing lines 41a, 41b with diagnostic valve 28 and check valve 27, parts of return lines 14a, 14b, pressure sensor 20, parts of hydraulic lines 22a, 22b with isolation valves 23a, 23b, simulation device 3 with simulator chamber 29, simulator spring chamber 30 and simulator piston 31 and associated simulator enabling valve 32 with check valve 34, first pressure supply device 5 with piston 36, pressure space 37, electric motor 35 and rotor position sensor 44, system pressure line 38 with system pressure sensor 19, sequence valves 26a, 26b, anti-cavitation valve 52 and electronic control unit 12, which carries out signal processing and activation of the components of module 160. According to the illustrative embodiment, the electrically controllable pressure modulation device for setting wheel-specific brake pressures with inlet valves 6a-6d with, in each case, a check valve connected in parallel and outlet valves 7a-7d, brake circuit sections 13a, 13b, parts of the return lines 14a, 14b and parts of the hydraulic lines 22a, 22b between brake master cylinder 2 and brake circuit sections 13a, 13b, and the second electrically controllable pressure supply device 49 and the second electronic control unit 139 are arranged in a second electrohydraulic module 140, the control unit carrying out signal processing of a pressure sensor 45 arranged in brake circuit I and activation of pressure supply device 49 and of valves 6a-6d, 7a-7d of module 140. Pressure supply device 49 comprises a pump 42 driven by an electric motor 43 and, according to the example, is of dual-circuit design. Each intake side of the pumps 42 is connected hydraulically to one of the two return lines 14a, 14b, which connect those ports of the outlet valves 7c, 7d; 7a, 7b of a brake circuit I, II which face away from the wheels to a chamber of the pressure medium reservoir 4, while the pressure sides of the pumps 42 are connected hydraulically to brake circuit sections 13a, 13b and hence to the input-side ports of the inlet valves 6a-6d. Module 140 thus represents an open antilock system. If pressure supply device 5 fails, all the control functions of the "brake-by-wire" operating mode can be maintained. However, it is also possible for the volume consumption of pressure supply device 5 to be compensated with the aid of pressure supply device 49. Pressure supply device 49 is used to supply additional volume after failure of module 160, in particular of pressure supply device 5, when the brake pedal 1 is actuated. This volume boost is either controlled by the pressure sensor 45 in module 140 or controlled by detecting (sensor 25) the pedal position independently of module 160 and making available the position to both modules 160 and 140, as already explained with reference to FIG. 1. When the brake pedal 1 is released, the additional volume is discharged into the pressure medium reservoir 4 via the outlet valves 7a-7d.

Figure 4:
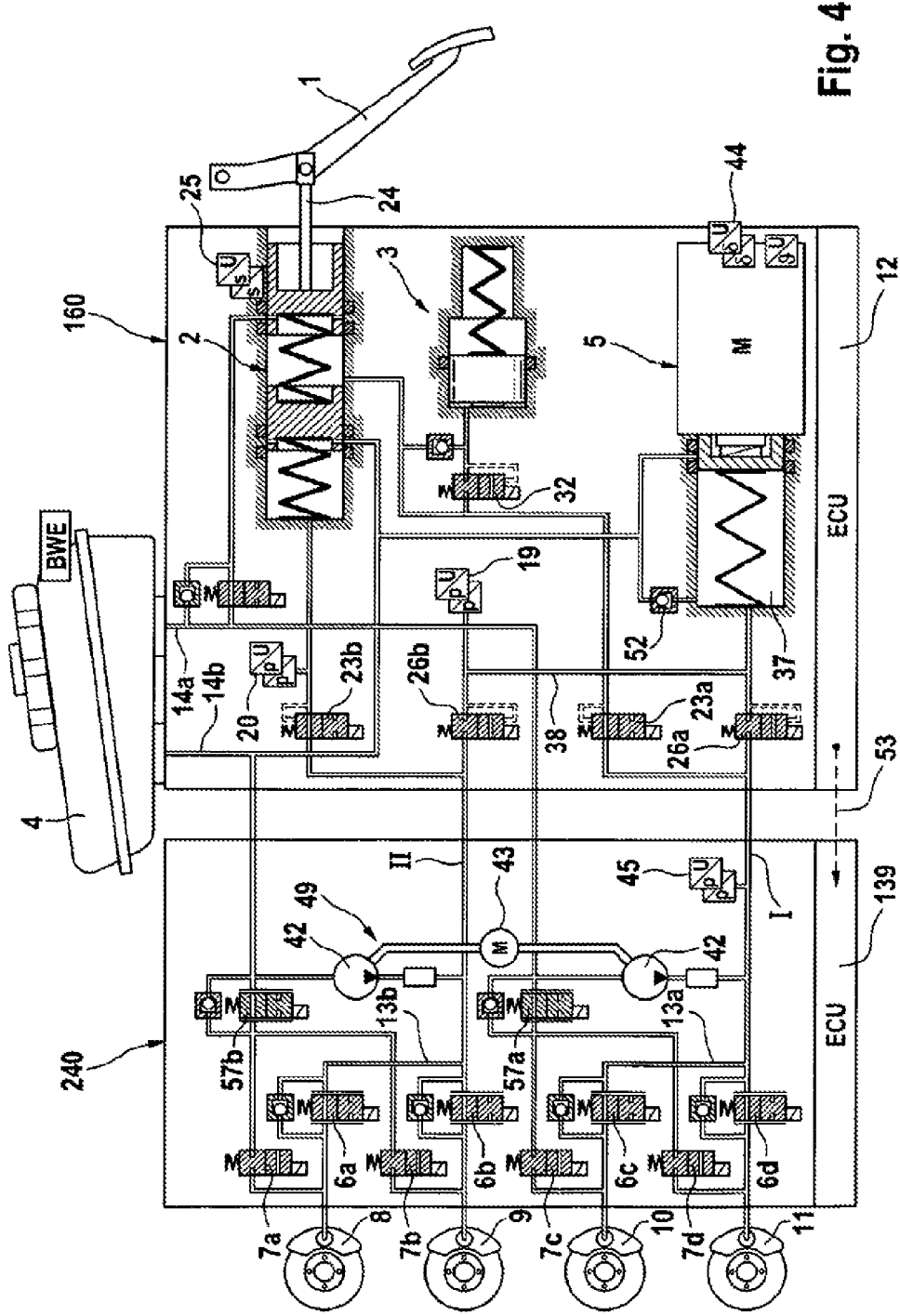
FIG. 4 shows a fourth illustrative embodiment of a brake system according to the invention.

FIG. 4 shows the hydraulic circuit diagram of a fourth illustrative embodiment of a brake system according to the invention, which corresponds essentially to the third illustrative embodiment. In contrast to the third illustrative embodiment, module 240 of the fourth illustrative embodiment, which corresponds to module 140 of the third illustrative embodiment, comprises an additional pressure control valve 57a, 57b, which can be activated in an analog manner, for each brake circuit I, II, the valve being arranged in the hydraulic connection between the outlet valves 7c, 7d; 7a, 7b of brake circuit I, II and the intake side of the pump 42. Pressure control valves 57a, 57b are advantageously embodied so as to be open when deenergized (normally open). A check valve (not denoted specifically) which opens toward the outlet valves is connected in parallel with each of the pressure control valves 57a, 57b. The additional valves 57a, 57b make it possible to discharge additional pressure medium volume without pulsations and noise.

As an alternative (not shown), the outlet valves 7a-7d, which are closed when deenergized (normally closed), can be embodied so as to be capable of analog activation instead of the additional pressure control valve 57a, 57b which can be activated in an analog manner.

Figure 5:
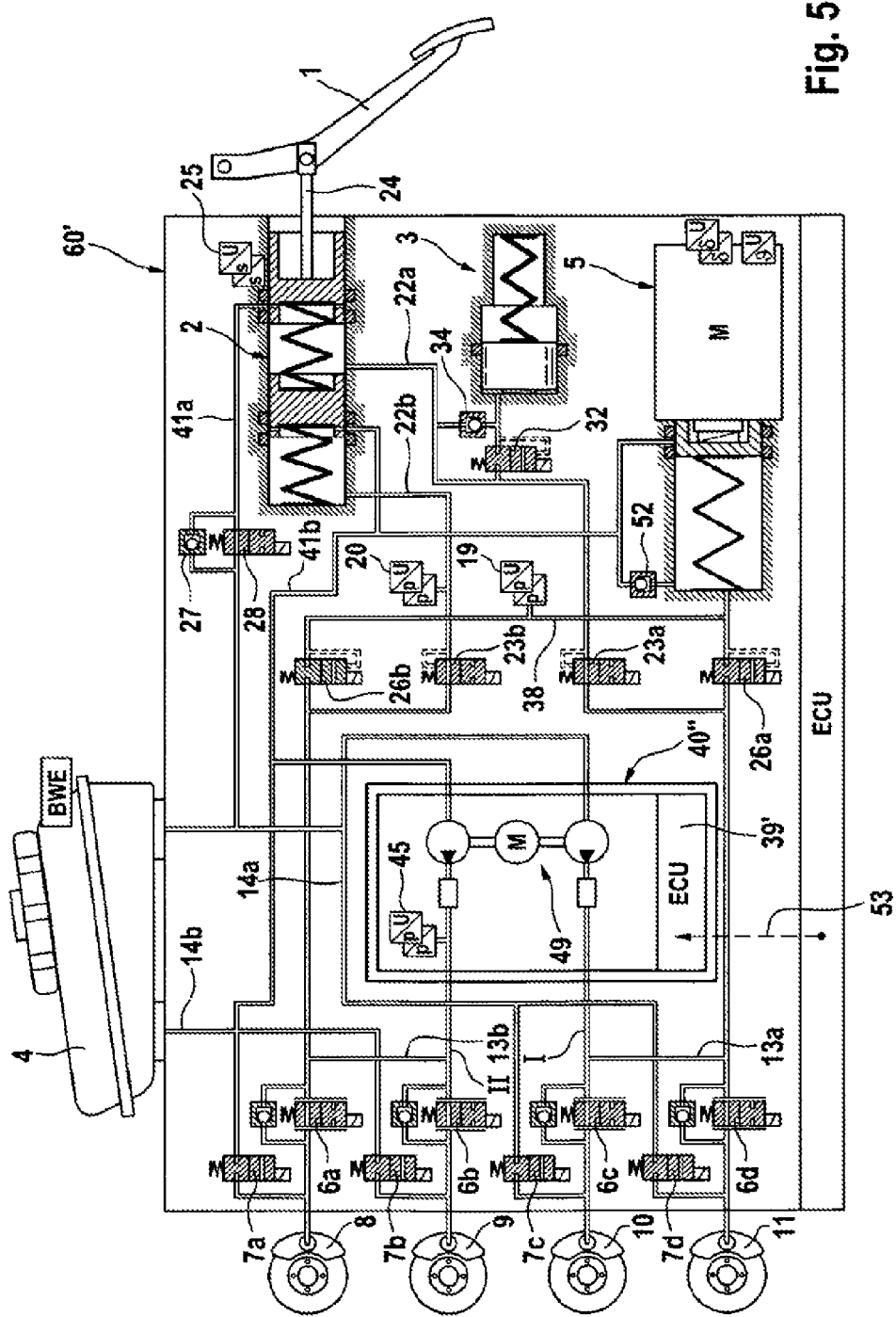
FIG. 5 shows a fifth illustrative embodiment of a brake system according to the invention.

A fifth illustrative embodiment of a brake system according to the invention is illustrated schematically in FIG. 5. The brake system essentially comprises the same hydraulic components as the third illustrative embodiment but these are arranged differently in modules 40" and 60' (integrated arrangement of module 40" in module 60'). Module 60' essentially comprises the brake master cylinder 2, the first pressure supply device 5, the simulation device 3, valves 27, 28, 32, 34, 23a, 23b, 26a, 26b, 52, pressure sensors 19, 20, the associated lines 13a, 13b, 14a, 14b, 22a, 22b, 38, 41a, 41B and electronic control unit 12 plus the inlet and outlet valves 6a-6d, 7a-7d. Control unit 12 is designed for activation and/or evaluation of the components. The separate submodule 40", which comprises a dedicated electronic control unit 39', comprises a dual-circuit motor-pump assembly 49 plus a pressure-side pressure sensor 45. Submodule 40" has an intake-side and a pressure-side port for each brake circuit I, II. The intake-side ports are connected to return lines 14a and 14b respectively and hence to the pressure medium reservoir 4. The pressure-side ports are connected to the brake circuit supply lines 13a, 13b. This illustrative embodiment offers the advantage that submodule 40" can simply be removed, if appropriate, if the intention is to dispense with the second pressure supply device 49.

A corresponding integrated embodiment is also conceivable for the fourth illustrative embodiment but, because of the position of the additional analog valves 57a, 57b, this is less advantageous than in the third illustrative embodiment.

Figure 6:
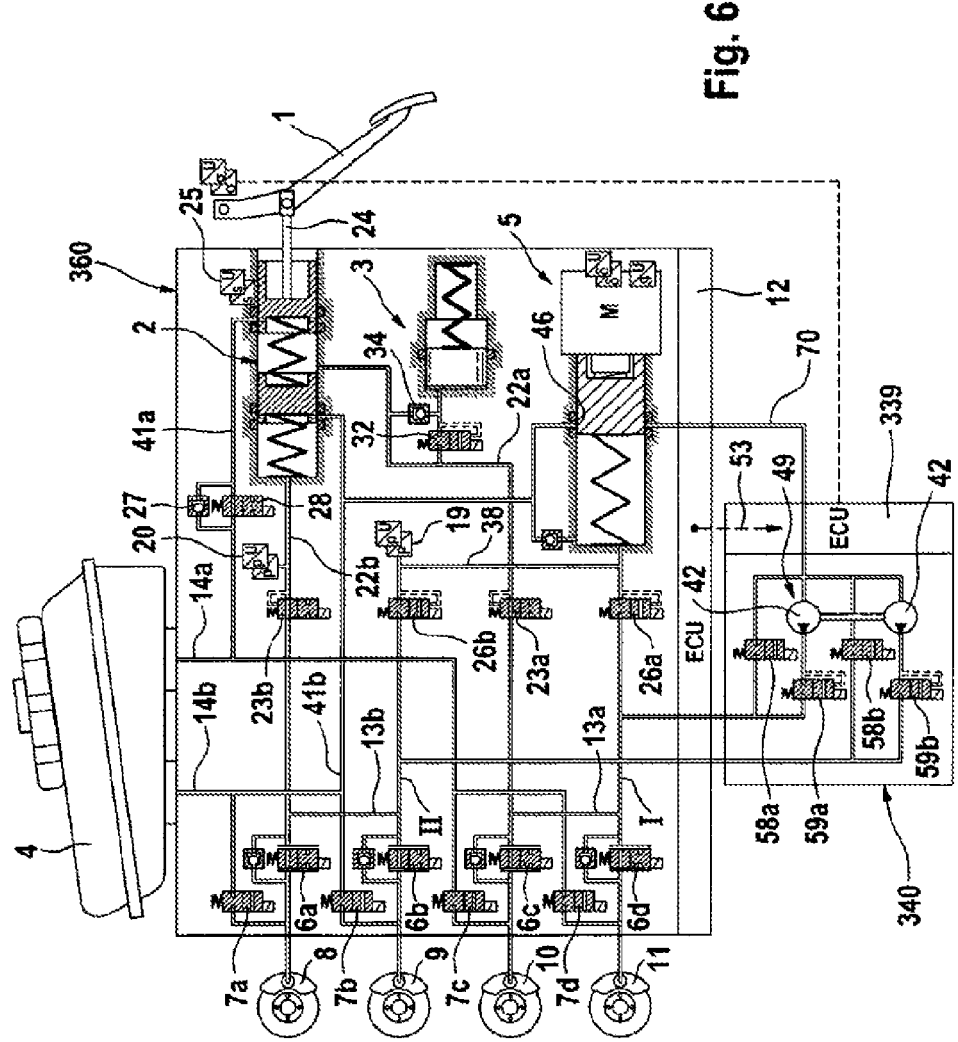
FIG. 6 shows a sixth illustrative embodiment of a brake system according to the invention.

A sixth illustrative embodiment of a brake system according to the invention is illustrated schematically in FIG. 6. Module 360 essentially comprises the brake master cylinder 2, the first pressure supply device 5, the simulation device 3, valves 27, 28, 32, 34, 23a, 23b, 26a, 26b, 52, pressure sensors 19, 20, the associated lines 13a, 13b, 14a, 14b, 22a, 22b, 38, 41a, 41b and electronic control unit 12 plus the inlet and outlet valves 6a-6d, 6a-7d. Control unit 12 is designed for activation and/or evaluation of the components. The separate submodule 340, which comprises a dedicated electronic control unit 339, comprises a dual-circuit motor-pump assembly 49 (the electric motor is not shown) and, for each circuit, an electrically activatable valve 59a, 59b, which is embodied so as to be closed when deenergized (normally closed) and is arranged in the hydraulic connection between the pump pressure side and brake circuit sections 13a, 13b. An electrically activatable valve 58a, 58b connected in parallel with the pump 42 and the valve 59a, 59b, which is likewise embodied so as to be closed when deenergized (normally closed), is furthermore provided in each circuit. The intake sides of the pumps 42 are connected by a common hydraulic line 70 to port 46 of pressure supply device 5 and hence to the pressure medium reservoir 4. Control unit 339 controls the electric motor of the motor-pump assembly 49 and valves 58a, 58b, 59a, 59b. In addition, module 360 can comprise a pressure sensor (not shown) for each circuit, the pressure sensor measuring the brake circuit pressures.

Figure 7:
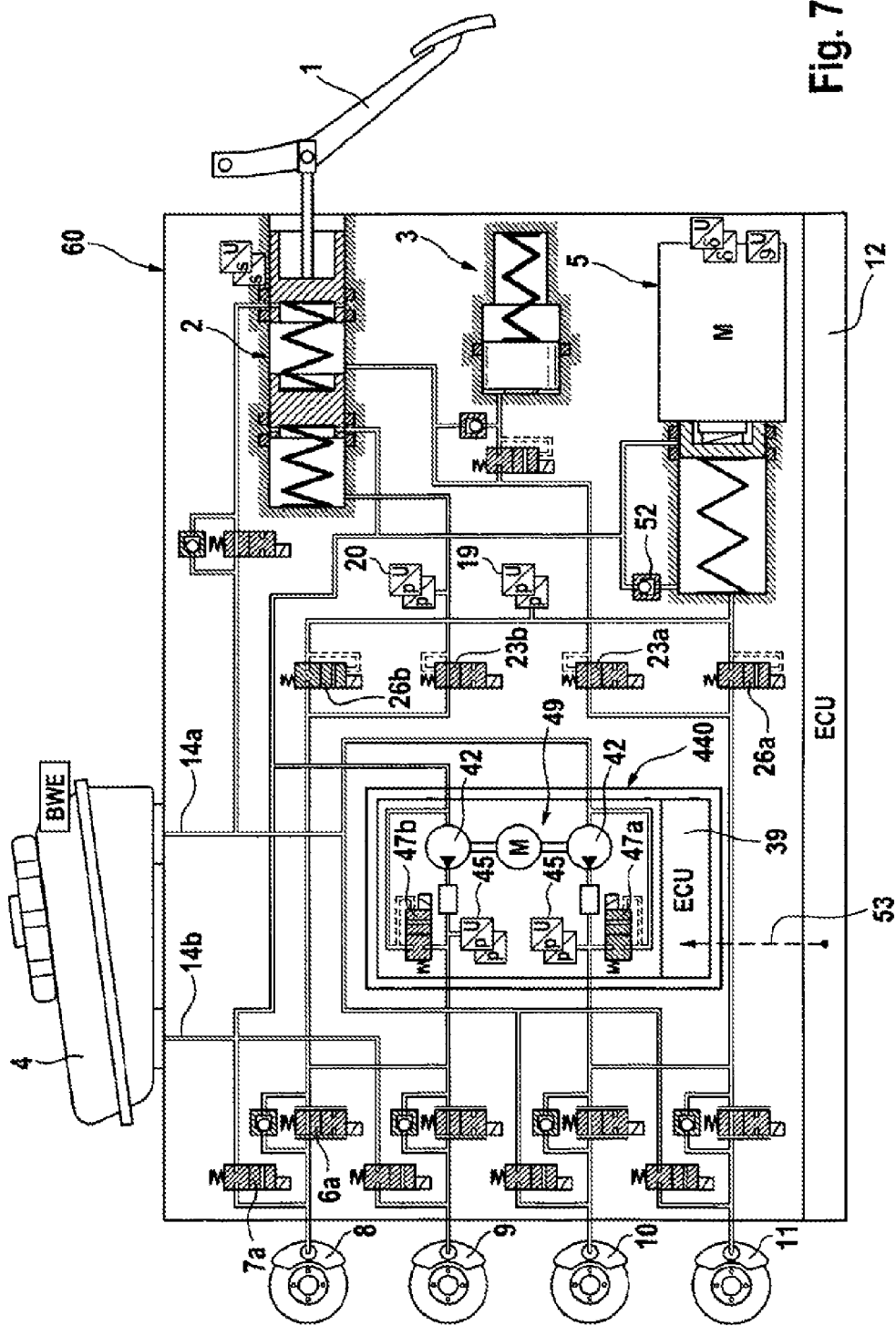
FIG. 7 shows a seventh illustrative embodiment of a brake system according to the invention.

The seventh illustrative embodiment of a brake system according to the invention, which is illustrated in FIG. 7, corresponds essentially to the first illustrative embodiment. In contrast to the first illustrative embodiment, the boost module 440 of the seventh illustrative embodiment comprises a pressure sensor 45 arranged on the pressure side of the pump 42 in each circuit. Moreover, each intake side of the pump 42 is connected hydraulically to one of the two return lines 14a, 14b which connect those ports of the outlet valves 7c, 7d; 7a, 7b of one brake circuit I, II which face away from the wheels to a chamber of the pressure medium reservoir 4.

While the above description constitutes the preferred embodiment of the present invention, it will be appreciated that the invention is susceptible to modification, variation, and change without departing from the proper scope and fair meaning of the accompanying claims.

The invention claimed is:

1. A brake system for motor vehicles, which can be activated in a brake-by-wire operating mode both by a vehicle driver and independently of the vehicle driver, which is normally operated in the brake-by-wire operating mode, and can be operated in at least one fallback operating mode, the brake system comprising:
a brake master cylinder having a housing and two pistons, which delimit two pressure spaces in the housing, the pressure spaces being assigned to first and second brake circuits with corresponding pairs of wheel brakes,
a pressure medium reservoir having at least two chambers assigned to the first and the second brake circuits,
a brake pedal for actuating the brake master cylinder, the pedal being coupled to a piston of the brake master cylinder,
an electrically operable normally open isolation valve for each of the brake circuits for separating the brake circuit into a brake circuit section which can be pressurized by the vehicle driver and a brake circuit section which can be pressurized by an electronic control, an electrically operable normally open inlet valve and an electrically operable normally closed outlet valve for each wheel brake for setting wheel-specific brake pressures, a first electrically controllable pressure supply device, which is formed by a cylinder-piston arrangement, the piston of which can be actuated by an electromechanical actuator, an electrically operable normally closed sequence valve for each of the brake circuits for hydraulically connecting the first electrically controllable pressure supply device to the brake circuit section which can be pressurized by the electronic control, a simulation device, which can be connected hydraulically to at least one pressure space of the brake master cylinder by means of an electronically or mechanically operable simulator enabling valve and which, in the brake-by-wire operating mode, conveys a haptic brake pedal sensation to the vehicle driver, and a first electronic control unit for activating the first pressure supply device, the isolation valve, the sequence valve, and the simulator enabling valve, wherein a second electrically controllable pressure supply device having at least one intake port and one pressure port is provided, the at least one intake port of the second electrically controllable pressure supply device is connected directly without the interposition of a valve to the pressure medium reservoir or to a low-pressure accumulator and the pressure port of the second electrically controllable pressure supply device is connected to the brake circuit section of a brake circuit which can be pressurized by the electronic control.

2. The brake system as claimed in claim 1, wherein the second pressure supply device comprises at least two hydraulic pumps driven jointly by an electric motor, wherein each of the intake ports of the first and second pumps are connected to the pressure medium reservoir, and the pressure ports of the first and the second pumps are each connected to the brake circuit section of one of the first and the second brake circuits which can be pressurized by the electronic control, wherein the second pressure supply device comprises a rotor angle sensor, which detects the instantaneous phase angle of the electric motor.

3. The brake system as claimed in claim 2, wherein an electrically operable normally closed overflow valve that is activated in an analog manner is provided for each of the first and the second pump, the overflow valve being connected in parallel with the corresponding pump.

4. The brake system as claimed in claim 3, wherein a second electrically operable normally closed valve, is provided for each of the first and the second pump, the second valve being arranged in a hydraulic connection between the pressure port and that brake circuit section of the brake circuit which can be pressurized by the electronic control.

5. The brake system as claimed in claim 3 wherein at least one pressure detection device is provided, the device detecting the pressure on the pressure port side of the second pressure supply device.

6. The brake system as claimed in claim 5, wherein a second electronic control unit is provided for the purpose of activating the second pressure supply device, and for activating the overflow valves, and for evaluating the output signals of the at least one pressure detection device.

7. The brake system as claimed in claim 6, wherein the second pressure supply device, the at least one pressure detection device and the second electronic control unit, and the overflow valves, are arranged in a self-contained subassembly, which is supplied with energy by an independent electric energy source.

8. The brake system as claimed in claim 1 wherein each intake port is connected to a hydraulic reservoir connection line which leads to the pressure medium reservoir, which is exposed to atmospheric pressure.

9. The brake system as claimed in claim 1 wherein each intake port is connected to a hydraulic return line, which connects an outlet valve assigned to a related wheel brake to the pressure medium reservoir exposed to atmospheric pressure.

10. The brake system as claimed in claim 9, wherein an electrically operable control valve activated in an analog manner, is connected in parallel to a check valve that opens toward the outlet valve and is arranged in the hydraulic connection between the outlet valve and the intake port.

11. A method for operating a brake system as claimed in claim 1 when the isolation valve, the sequence valve, the simulator enabling valve and, the inlet and the outlet valves of the brake system are in their respective normally open or normally closed states, the method comprising the steps of:
performing a volume boosting operation to shorten travel of the brake pedal,
drawing in pressure medium from the pressure medium reservoir exposed to atmospheric pressure to the second electrically controllable pressure supply device,
feeding the pressure medium into the brake circuit sections,
wherein the method is performed in response to actuation of the brake pedal by the vehicle driver and in response to determining that it is not possible to carry out a pressure buildup or pressure reduction by means of the first pressure supply device.

12. The method as claimed in claim 11, further comprising outputting a confirmation signal from the first control unit to a second control unit operatively connected to and configured for activating the second pressure supply device for as long as at least one of a pressure buildup or pressure reduction can be carried out by way of the first pressure supply device.

13. The method as claimed in claim 11 further comprising detecting actuation of the brake pedal by way of a travel detection device that detects an actuating travel of at least one of the pistons of the brake master cylinder, and outputting the signals of the travel detection device to the second control unit and evaluating the signals at the second control unit.

* * * * *